US005703862A

United States Patent [19]
Lee et al.

[11] Patent Number: 5,703,862
[45] Date of Patent: Dec. 30, 1997

[54] DUAL FOCUS OBJECTIVE LENS WITH TWO CURVATURES FOR FOCUSSING LIGHT ON TWO DIFFERENT KINDS OF DISKS WITH DIFFERENT THICKNESSES

[75] Inventors: Chul-woo Lee; Jang-hoon Yoo, both of Seoul, Rep. of Korea

[73] Assignee: Samsung Electronics Co., Ltd., Suwon, Rep. of Korea

[21] Appl. No.: 587,783

[22] Filed: Dec. 26, 1995

[30] Foreign Application Priority Data

Jun. 7, 1995 [KR] Rep. of Korea ............... 95-14928

[51] Int. Cl.$^6$ ............................................. G11B 7/00
[52] U.S. Cl. ..................... 369/112; 369/44.23; 369/94
[58] Field of Search ............................. 369/112, 44.23, 369/94, 103, 44.37, 109, 110; 359/19, 487, 497

[56] References Cited

U.S. PATENT DOCUMENTS 4,566,762  1/1986  Kato ................................. 359/487

FOREIGN PATENT DOCUMENTS 62-73429   4/1987   Japan.
7-302437  11/1995   Japan.

OTHER PUBLICATIONS

Y. Komma et al., "Dual focus optical head for 0.6mm and 1.2mm disks," *Optical Data Storage*, SPIE vol. 2338, 1994, pp. 282–288.

*Primary Examiner*—David C. Nelms
*Assistant Examiner*—Kim-Kwok Chu
*Attorney, Agent, or Firm*—Burns, Doane, Swecker & Mathis, L.L.P.

[57] ABSTRACT

A dual-focus objective lens for an optical pickup which is compatible with both 0.6 mm and 1.2 mm disks is compensated in its aberration with respect to a light spot on a recording plane of the loaded disk and at least one of a light-receiving plane and a light-emitting plane of the dual focus objective lens has a first curvature unit and a second curvature unit whose curvature radii are different from each other. Incident light beams passing through the whole region of the first curvature unit and second curvature unit are focused onto the thinner disk, and parts of incident light beams passing through the region around the first curvature unit are focused onto the thicker disk. In the optical pickup having the dual focus objective lens, since the light is not divided, light efficiency is improved, thereby reproducing a signal with a high signal-to-noise ratio. Particularly, an optical pickup enabling recording as well as reproduction is obtained.

4 Claims, 7 Drawing Sheets

DUAL FOCUS OBJECTIVE LENS WITH TWO CURVATURES FOR FOCUSSING LIGHT ON TWO DIFFERENT KINDS OF DISKS WITH DIFFERENT THICKNESSES

BACKGROUND OF THE INVENTION

The present invention relates to an objective lens used for an optical pickup for recording or reproducing information optically with respect to disks having different thicknesses, and more particularly, to a dual focus objective lens for an optical pickup whose aberration for each optical focus on the recording planes of the disks having different thicknesses is compensated.

As an optical recording medium, well-known compact disk have a substrate thickness of 1.2 mm, with 0.6 mm disks having been recently developed for high-density recording. In order to read the information stored at high density, the size of a focused optical spot should be reduced. For this purpose, it is necessary to use a short-wavelength light source and an objective lens having a large numerical aperture.

However, since an objective lens having a large numerical aperture is extremely unstable, causing aberration when the disk is tilted, the disk's slope must be tightly controlled during reproduction. This aberration increases in proportion to the thickness and slope of the disk substrate. Therefore, a slope error tolerance can be increased by making the substrate as thin as possible, thereby realizing practical high-density reproduction. With the advent of disks of varying thickness, a compatible optical pickup is required for the various kinds (different thicknesses) of disks.

FIG. 1 shows a conventional dual-focus optical pickup for 0.6 mm disks and 1.2 mm disks, by which spherical aberration caused by different disk thicknesses is compensated for. Here, a reference numeral 1 is a 0.6 mm disk and reference numeral 2 is a 1.2 mm disk, with one or the other disk being loaded into a disk drive (not shown).

Referring to FIG. 1, a conventional dual-focus optical pickup is constituted by a laser diode 3 for generating a laser light beam, a half mirror 4 for partially reflecting and partially transmitting the light beam, a collimating lens 5 for directing the reflected light beam as a collimated light toward the loaded disk 1 or 2, a hologram lens 6 for diffracting the collimated light, and an objective lens 9 for focusing the zero-order transmitted light beam 7 and 1st-order diffracted light beam 8 of hologram lens 6 onto disks 1 and 2, respectively. Also, a sensor lens 10 is provided for receiving the information-bearing reflected light beam of disk 1 or disk 2, to be detected by a photo-detector 11.

Generally, hologram lens 6 is blazed so as to diffract either +1st-order diffracted light beam or −1st-order diffracted light beam in order to prevent the lowering of the light efficiency. Utilizing the difference between the emitting angles of zero-order transmitted light beam 7 and 1st-order diffracted light beam 8 of hologram lens 6, 0.6 mm disk 1 is read using zero-order transmitted light beam 7, as shown in FIG. 2, and 1.2 mm disk 2 is read using 1st-order diffracted light beam 8, as shown in FIG. 3.

However, in the dual focus optical pickup having the aforementioned hologram lens, the incident light is divided into a zero-order light beam and a 1st-order diffracted light beams, and one of these beams is used in reading a signal from the loaded disk. Thus, light efficiency is very low and the signal-to-noise ratio of the reproduced signal is reduced. Moreover, since another light spot having a different focal plane is landed on the loaded disk simultaneously, recording is very difficult due to the light interference of the other light spot. Also, since the light is reflected from the two spots, each being received by the photo-detector and thus causing interference, it is difficult to obtain a clean reproduced signal and to detect a focal signal exactly.

SUMMARY OF THE INVENTION

To solve the above problems, it is, therefore, an object of the present invention to provide a dual-focus objective lens of an optical pickup, for focusing a single incident light onto disks having different thicknesses without diffracting the light.

To accomplish the above object, a dual focus objective lens for an optical pickup to form a light spot onto disks having different thicknesses, comprises: at least a first curvature unit and a second curvature unit having at least one surface whose curvature radii are different from each other.

BRIEF DESCRIPTION OF THE DRAWINGS

The above objects and advantages of the present invention will become more apparent by describing in detail a preferred embodiment thereof with reference to the attached drawings in which:

FIGS. 2 and 3 partially show the conventional dual focus optical pickup, in which FIG. 2 shows an optical path for a 0.6 mm disk, and FIG. 3 shows an optical path for a 1.2 mm disk;

FIGS. 5 and 6 show the optical pickup having a dual focus objective lens according to the present invention, in which FIG. 5 shows an optical path for a 0.6 mm disk, and FIG. 6 shows an optical path for a 1.2 mm disk; and FIGS. 7 and 8 show the distributions of light intensities of light spots for each disk type, in which FIG. 7 is for a 0.6 mm disk, and FIG. 8 is for a 1.2 mm disk.

DETAILED DESCRIPTION OF THE INVENTION

Figure 1:
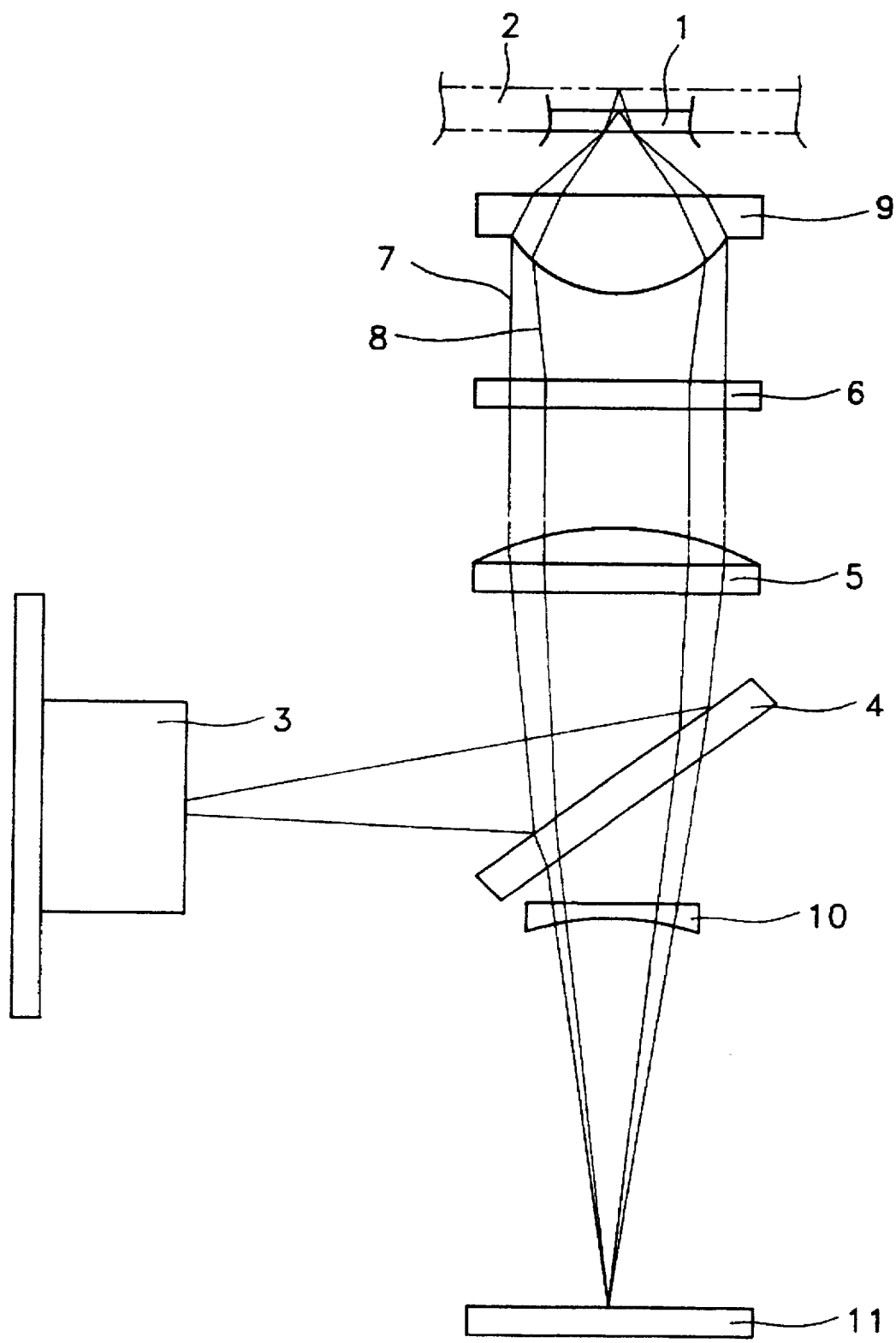
FIG. 1 is a schematic view showing a construction of a conventional dual focus optical pickup.
Figure 2:
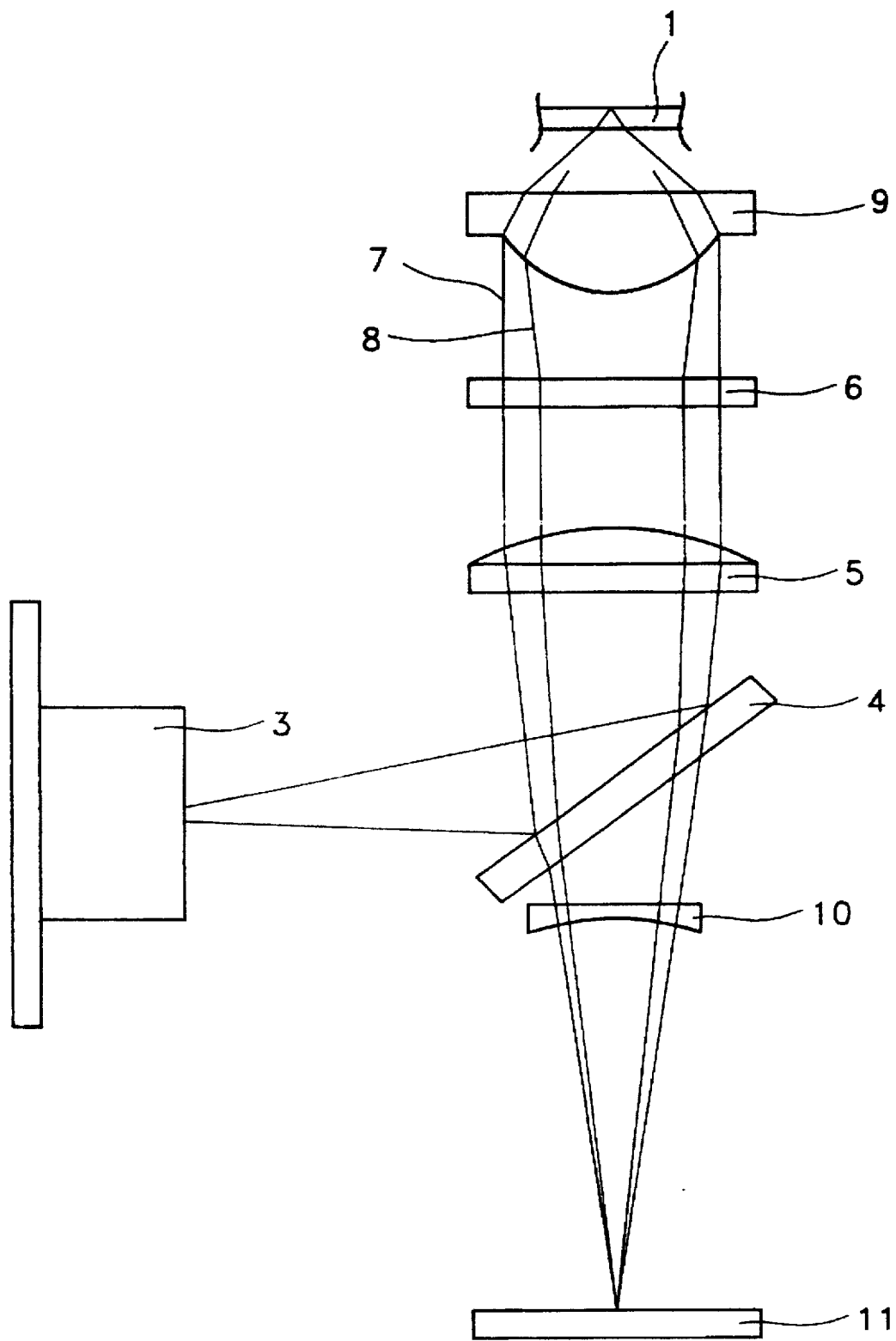
Figure 3:
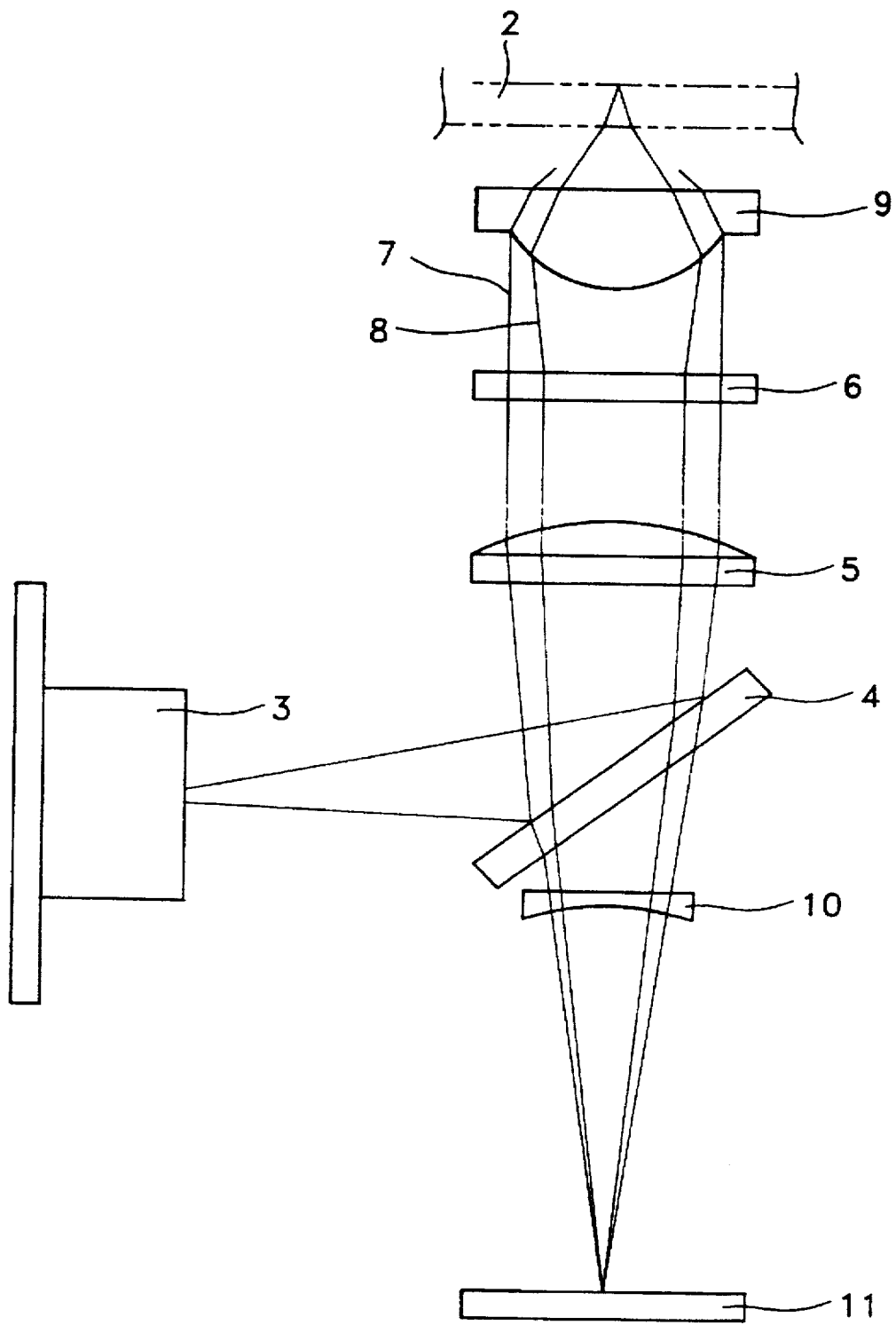
Figure 4:
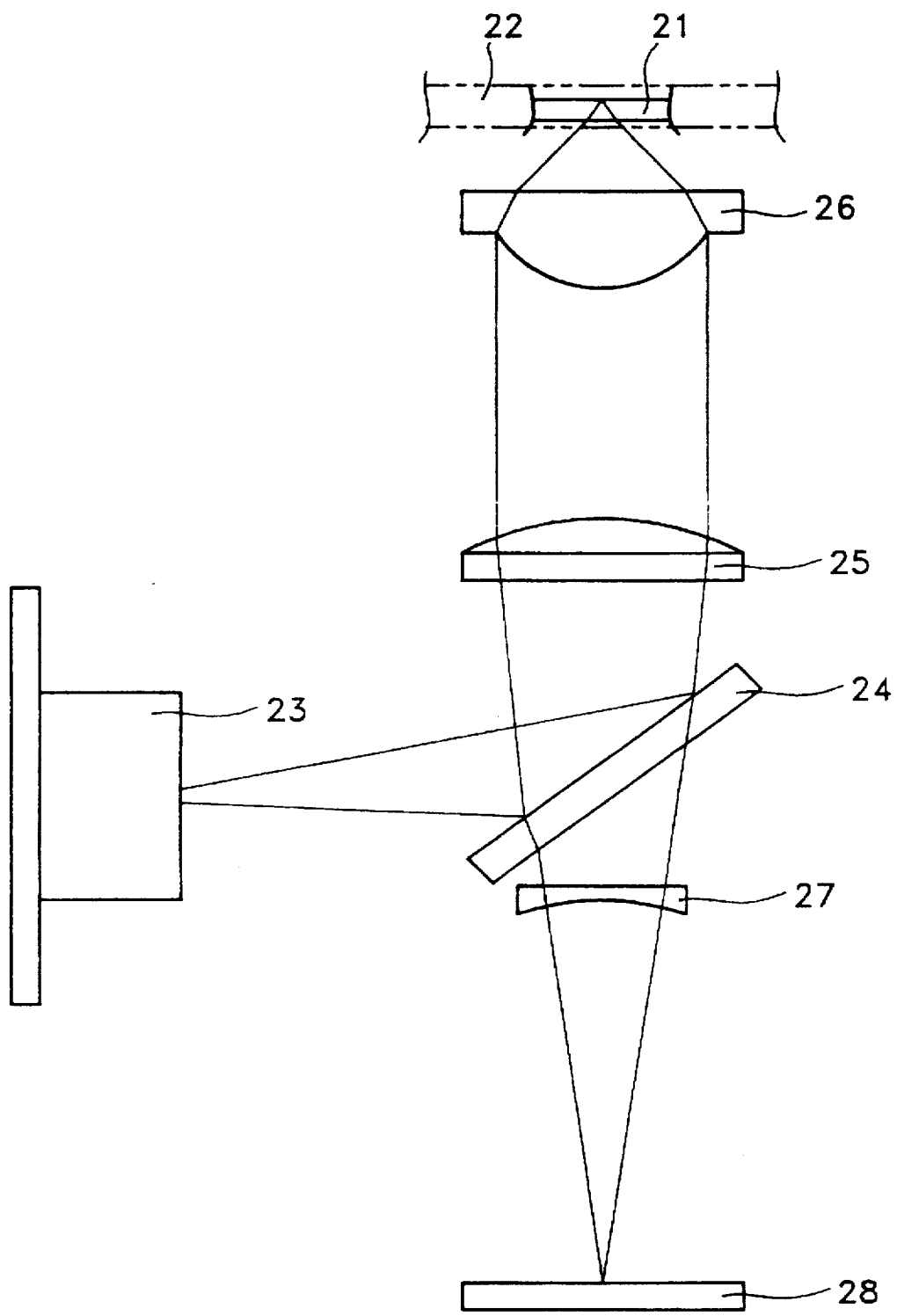
FIG. 4 is a schematic view showing a construction of an optical pickup having a dual focus objective lens according to the present invention.

In FIG. 4, a reference numeral 23 is a laser diode for generating a laser light beam, reference numeral 24 is a half mirror for partially reflecting and partially transmitting the generated light beam, reference numeral 25 is a collimating lens for making the reflected light beam from half mirror 24 parallel and directing it toward a disk 21 or 22, reference numeral 26 is an objective lens for focusing the collimated light from collimating lens 25 onto disk 21 or 22 to form a light spot thereon, and reference numerals 27 and 28 are a sensor lens and a photo-detector disposed for detecting a signal from the reflected light of disk 21 or 22. Here, the thinner disk 21 is a 0.6 mm disk and the thicker disk 22 is a 1.2 mm disk, either being installed within a drive (not shown).

Figure 5:
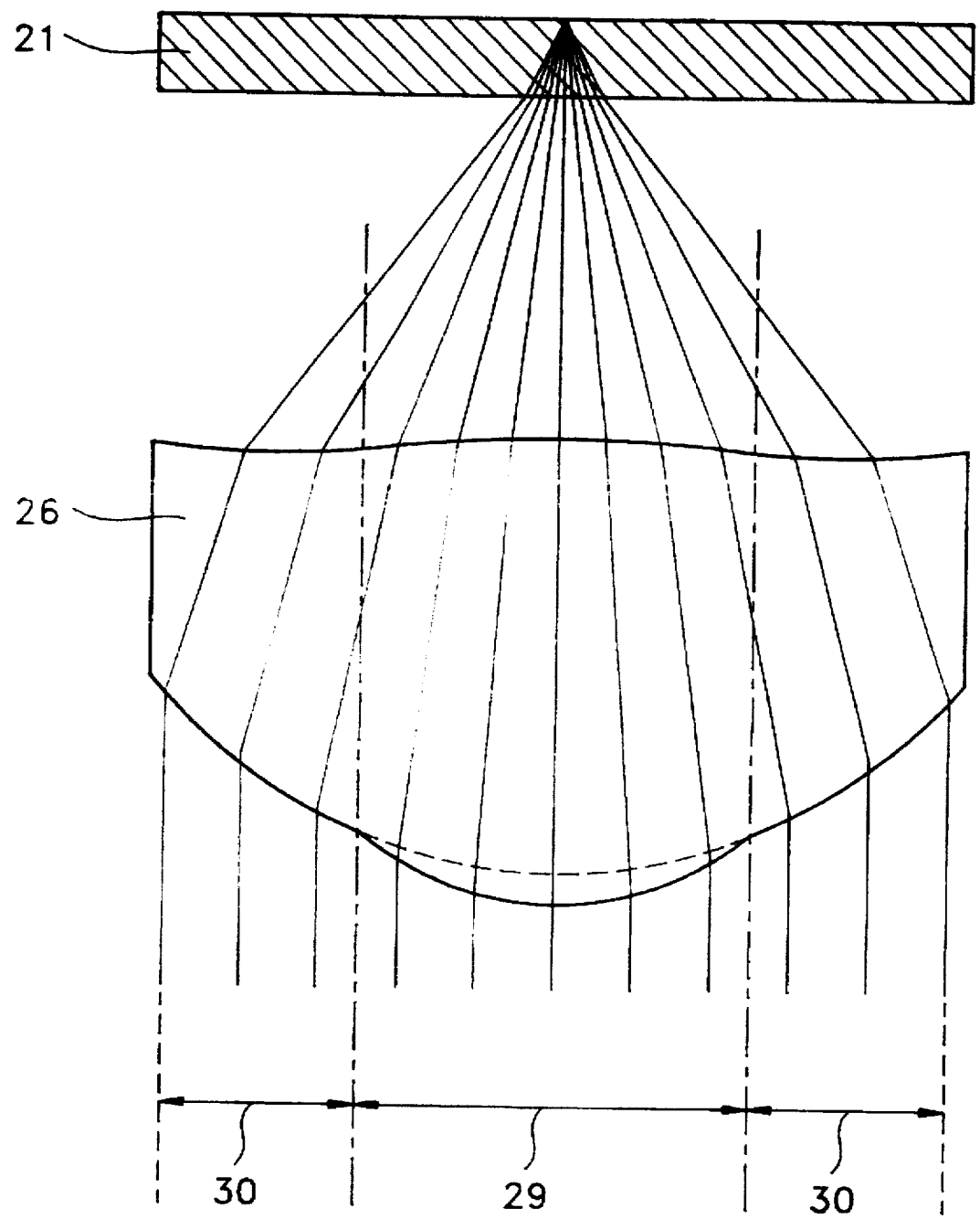
Figure 6:
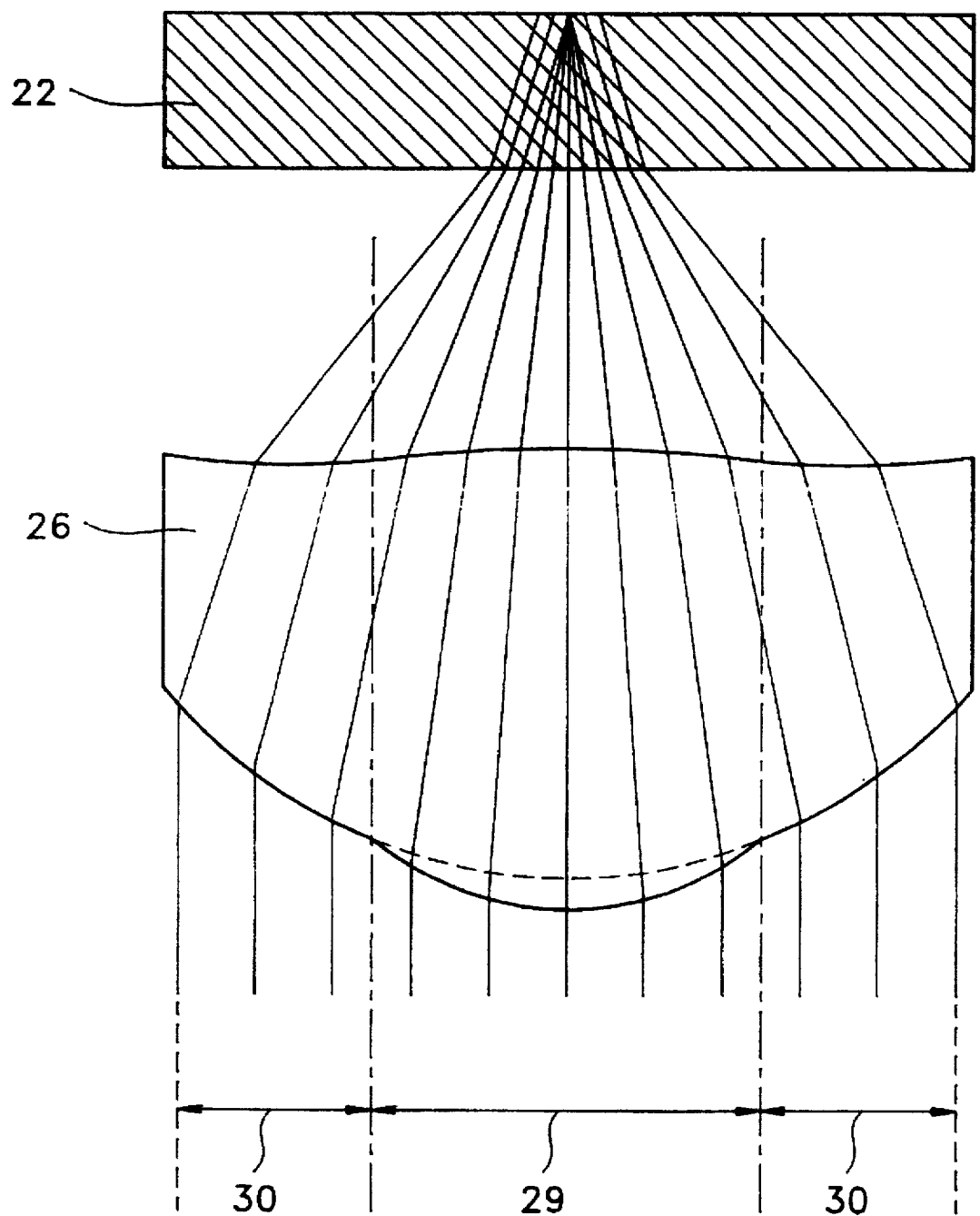

The light-receiving or emitting plane of dual focus objective lens 26 according to the present invention is divided into a first curvature unit 29 and a second curvature unit 30 whose curvature radii are different from each other, as shown in FIGS. 5 and 6. For thin disk 21, incident light beams passing through the whole region of first curvature unit 29 and second curvature unit 30 are focused onto the recording plane thereof, as shown in FIG. 5. For thick disk 22, incident light beams passing through the entire region of first curvature unit 29 and light beams passing through the second curvature unit 30 in the vicinity of first curvature unit 29 are focused onto the recording plane thereof, as shown in FIG. 6.

Dual focus objective lens 26 having the aforementioned configuration preferably has the following lens data, with respect to both 0.6 mm disk and 1.2 mm disk:

criteria for first curvature unit 29 radius: from the center to 2.4 mm thickness on an optical axis: 3.5 mm refractive index: 1.51 curvature radius of light-receiving plane: 2.45 mm cone constant of light-receiving plane: −0.428 aspherical surface coefficients of light-receiving plane: $-0.543e^{-5}$, $0.106e^{-5}$, $-0.298e^{-5}$ and $0.231e^{-5}$ curvature radius of the light-emitting plane: −7.69 mm cone constant of the light-emitting plane: −37.34 aspherical surface coefficients of light-emitting plane: $0.481e^{-2}$, $0.128e^{-2}$, $-0.310e^{-3}$ and $0.168e^{-4}$ criteria for second second curvature unit 30 radius: 2.4 mm up to 4.8 mm thickness on an optical axis: 3.11 mm refractive index: 1.51 curvature radius of light-receiving plane: 2.37 mm cone constant of light-receiving plane: −0.48 aspherical surface coefficients of light-receiving plane: $-0.160e^{-3}$, $0.340e^{-4}$, $-0.659e^{-5}$ and $0.247e^{-5}$ curvature radius of light-emitting plane: −7.69 mm cone constant of light-emitting plane: −37.34 aspherical surface coefficients of light-emitting plane: $1.481e^{-2}$, $0.128e^{-2}$, $-0.310e^{-3}$ and $0.168e^{-4}$ The distance between objective lens and 0.6 mm disk is 1.885 mm and the distance between objective lens and 1.2 mm disk is 1.5 mm.

Figure 7:
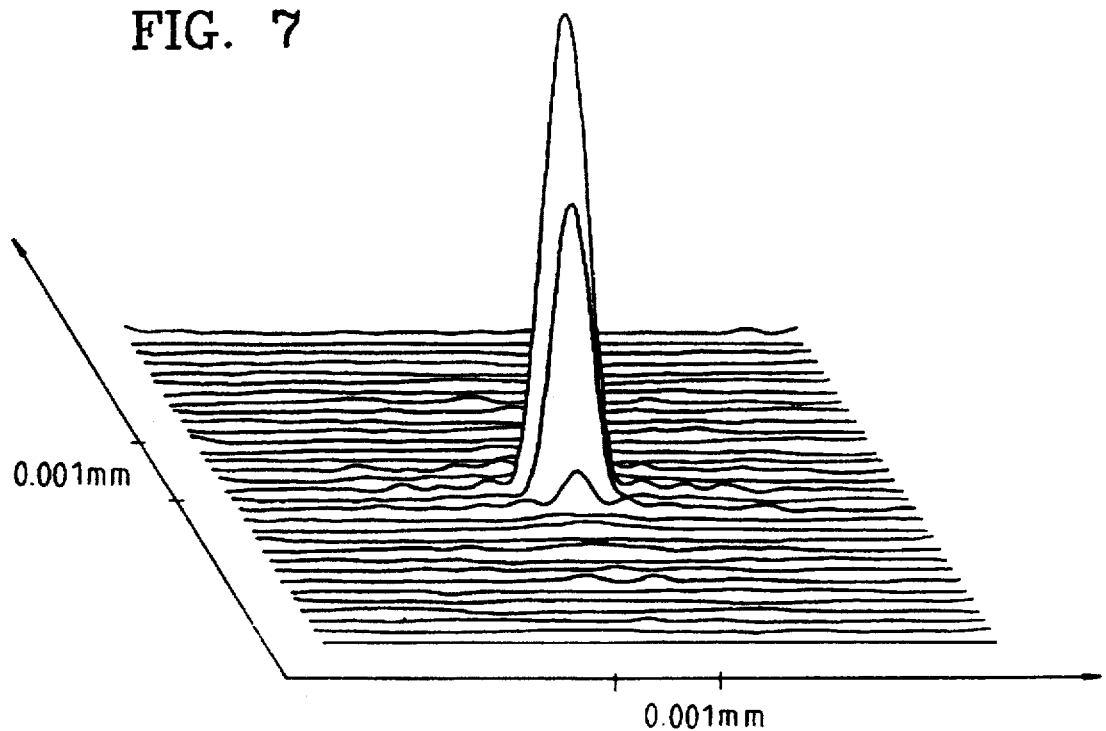
Figure 8:
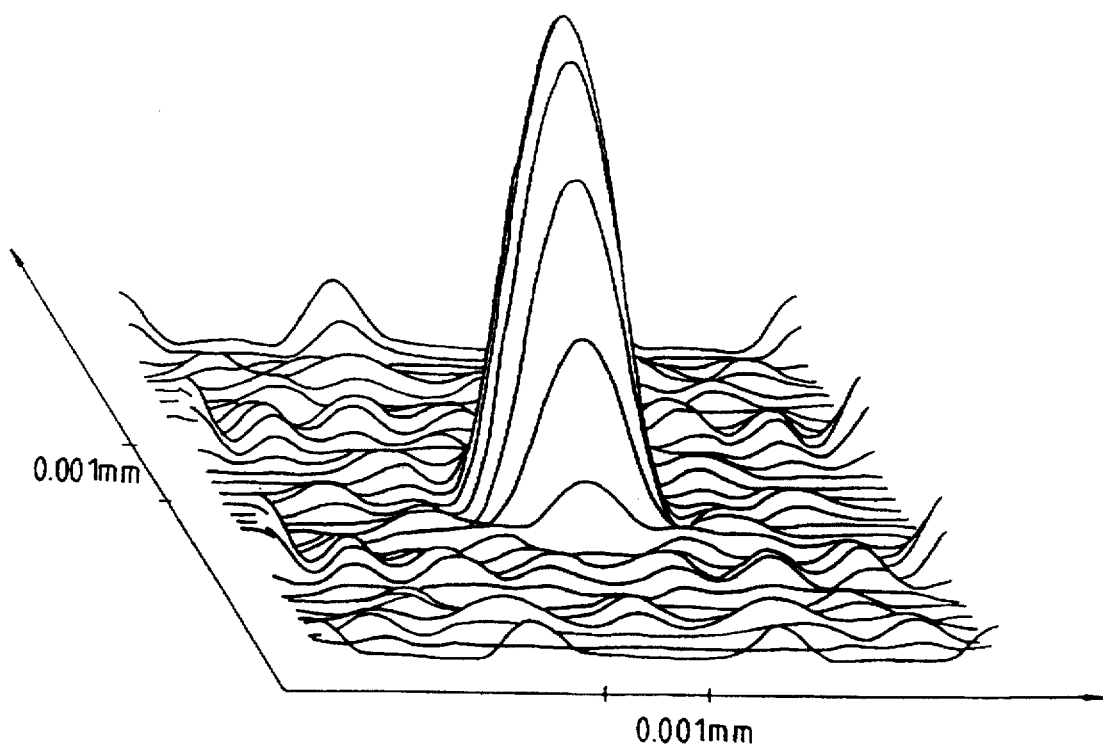

Under the above stated conditions, a light spot having a radius of 0.8 μm is formed on 0.6 mm disk and a light spot having a radius of 1.4 μm is formed on 1.2 mm disk, respectively. At this time, the light intensities for the respective light spots are shown in FIGS. 7 and 8, respectively.

As described above, the present invention provides an objective lens having at least a first curvature unit and a second curvature unit whose curvature radii are different from each other, on at least one plane of a light-receiving plane and a light-emitting plane so that an optical pickup for disks having different thicknesses can be attained without using a diffractive optical device as in the conventional hologram lens. Since the light is not divided for disks having different thicknesses, the present invention is effective in improving light efficiency and the signal-to-noise ratio of a reproduced signal. In particular, since a single incident light beam is utilized, an optical pickup enabling recording as well as reproduction is obtained.

The present invention is described by way of exemplary embodiments to which it is not limited. Modification and variations will occur to those skilled in the art without departing from the scope of the invention recited in the claims appended hereto.

What is claimed is:

1. A dual focus objective lens with two curvature units for an optical pickup for focussing an incident light beam so as to form a light spot on a disk, said disk being one of two different thicknesses, wherein at least one of a light-receiving plane and a light-emitting plane of said dual focus objective lens comprises a first curvature unit and a second curvature unit whose curvature radii are different from each other.

2. A dual focus objective lens for an optical pickup as claimed in claim 1, wherein said first curvature unit has a refractive index of 1.51, a curvature radius of light-receiving plane of 2.45 mm, and a curvature radius of the light-emitting plane of −7.69 mm, and said second curvature unit has a refractive index of 1.51, a curvature radius of light-receiving plane of 2.37 mm, and a curvature radius of light-emitting plane of −7.69 mm.

3. A dual focus objective lens for an optical pickup as claimed in claim 1, wherein said first curvature unit has a thickness on an optical axis of 3.5 mm, a refractive index of 1.51, a curvature radius of light-receiving plane of 2.45 mm, aspherical surface coefficients of light-receiving plane of $-0.543e^{-5}$, $0.106e^{-5}$, $-0.298e^{-5}$ and $0.231e^{-5}$, curvature radius of the light-emitting plane of −7.69 mm, and aspherical surface coefficients of light-emitting plane of $0.481e^{-2}$, $0.128e^{-2}$, $-0.310e^{-3}$ and $0.168e^{-4}$, and said second curvature unit has a thickness on an optical axis of 3.11 mm, refractive index of 1.51, curvature radius of light-receiving plane of 2.37 mm, aspherical surface coefficients of light-receiving plane of $-0.160e^{-3}$, $0.340e^{-4}$, $-0.659e^{-5}$ and $0.247e^{-5}$, curvature radius of light-emitting plane of −7.69 mm, cone constant of light-emitting plane of −37.34, and aspherical surface coefficients of light-emitting plane of $1.481e^{-2}$, $0.128e^{-2}$, $-0.310e^{-3}$ and $0.168e^{-4}$, and wherein the distance between said objective lens and one disk is 1.885 mm and the distance between said objective lens and another disk is 1.5 mm.

4. A dual focus objective lens for an optical pickup as claimed in claim 1, wherein said first curvature unit has a radius of from the center up to 2.4 mm, thickness on an optical axis of 3.5 mm, refractive index of 1.51, curvature radius of light-receiving plane of 2.45 mm, cone constant of light-receiving plane of −0.428, aspherical surface coefficients of light-receiving plane of $-0.543e^{-5}$, $0.106e^{-5}$, $-0.298e^{-5}$ and $0.231e^{-5}$, curvature radius of the light-emitting plane of −7.69 mm, cone constant of the light-emitting plane of −37.34, and aspherical surface coefficients of light-emitting plane of $0.481e^{-2}$, $0.128e^{-2}$, $-0.310e^{-3}$ and $0.168e^{-4}$, and said second curvature unit has a radius of 2.4 mm to 4.8 mm, thickness on an optical axis of 3.11 mm, refractive index of 1.51, curvature radius of light-receiving plane of 2.37 mm, cone constant of light-receiving plane of −0.48, aspherical surface coefficients of light-receiving plane of $-0.160e^{-3}$, $0.340e^{-4}$, $-0.659e^{-5}$ and $0.247e^{-5}$, curvature radius of light-emitting plane of −7.69 mm, cone constant of light-emitting plane of −37.34, and aspherical surface coefficients of light-emitting plane of $1.481e^{-2}$, $0.128e^{-2}$, $-0.310e^{-3}$ and $0.168e^{-4}$, and wherein the distance between said objective lens and one disk is 1.885 mm and the distance between said objective lens and another disk is 1.5 mm.

\* \* \* \* \*